Dec. 6, 1927.  
H. G. TRAVER  
AMUSEMENT DEVICE  
Filed July 1, 1925  
1,651,487  
2 Sheets-Sheet 1

Inventor  
H. G. Traver  
By his Attorney

Dec. 6, 1927.
H. G. TRAVER
1,651,487
AMUSEMENT DEVICE
Filed July 1, 1925      2 Sheets-Sheet 2
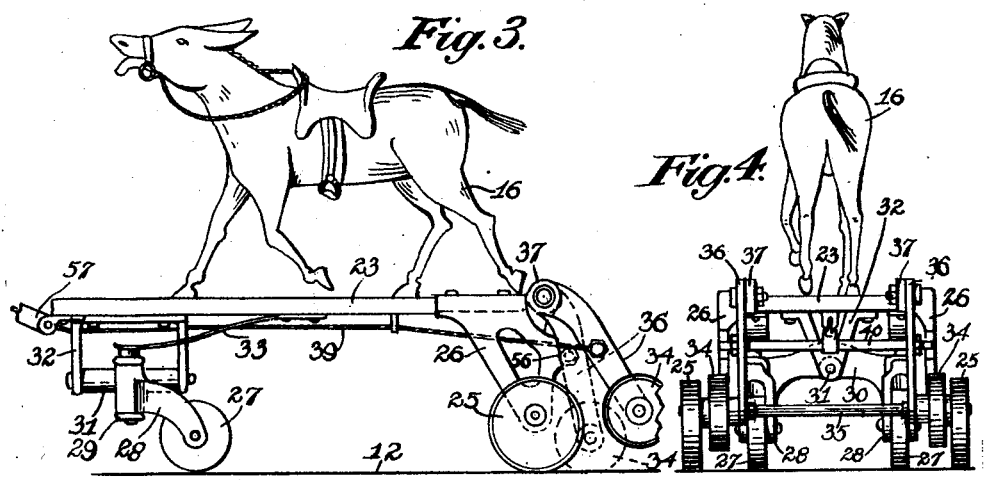
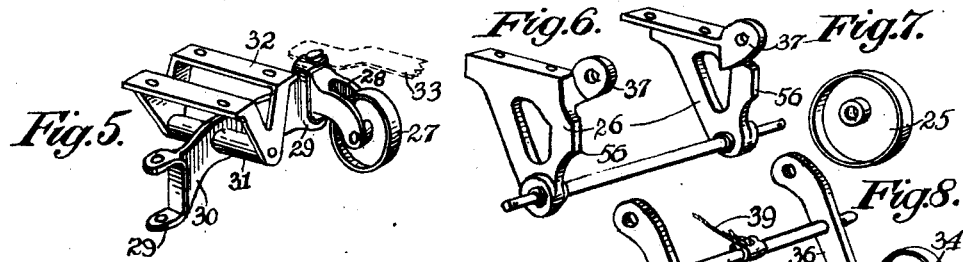
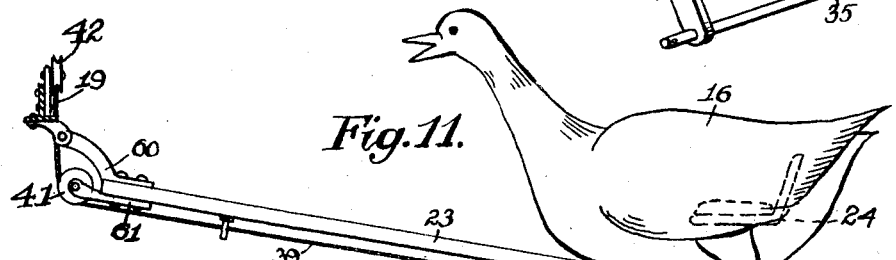
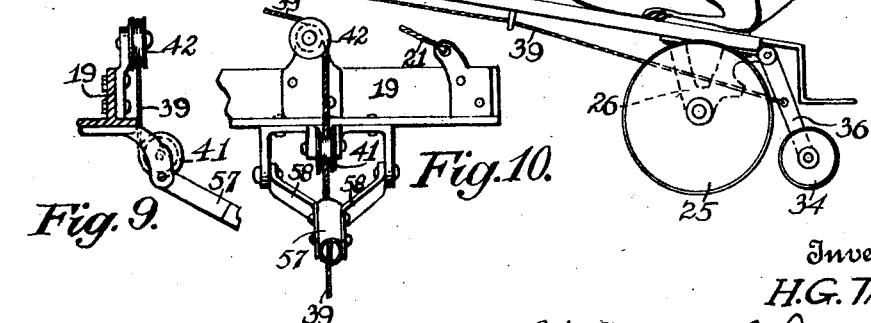
Inventor
H. G. Traver
By his Attorney Patented Dec. 6, 1927.

1,651,487

UNITED STATES PATENT OFFICE.

HARRY G. TRAVER, OF BEAVER FALLS, PENNSYLVANIA.

AMUSEMENT DEVICE.

Application filed July 1, 1925. Serial No. 40,944.

This invention relates to amusement apparatus usually termed "roundabouts" having a fixed platform whereon passenger carrying cars are propelled by a shaft rotatable centrally of the platform, said shaft having arms radiating therefrom to which the cars are connected and it is an object of the invention to provide an amusement device of this character which is novel and cheap to manufacture.

It is a further object of the invention to arrange the passenger car with two sets of supporting and traction wheels one set being mounted in fixed position on the car and the other set adjustably mounted on the car, said latter wheels being normally positioned whereby the car is supported by the fixedly supported wheels and arranged to be positioned to support and transport the car. One set of wheels is mounted to rotate about an axis eccentric to the center thereof to impart an up and down undulating movement to the car as it is propelled, while the other wheels are mounted to rotate on an axis centrally thereof and move the car in an even course as it is propelled on the platform. The car is further arranged whereby a rocking movement is adapted to be imparted thereto about the longitudinal axis of the car when the car is supported by the eccentrically mounted wheels.

A further object of the invention relates to the provision of means to propel passenger cars upon a platform and to combine therewith means operative as the cars are being propelled to adjust the adjustable car supporting wheels in position to transport the car thereby.

Other objects and advantages will hereinafter appear.

In the drawing accompanying and forming a part of this specification, Figure 1 is a fragmental elevational view partly in section of an amusement device embodying the invention.

Figure 3 is a side elevation of a passenger carrying car used in conjunction with the amusement device.

Figure 4 is a rear elevational view of the passenger carrying car shown in Figure 3.

Figure 5 is a perspective view of a wheel mounting means for supporting the front of the car.

Figure 6 is a perspective view showing the mounting means for the rear wheels of the car.

Figure 7 is a perspective view of an eccentrically mounted wheel used in connection with the car to transmit a wobbly motion to the car.

Figure 8 is a perspective view of a mounting member for the auxiliary wheels.

Figure 9 is a side view showing a part of a car propelling arm in section and the means for connecting a car thereto and actuating means for adjusting the auxiliary wheels.

Figure 10 is a view of the parts shown in Figure 9 looking at the right of said figure; and Figure 11 is a side elevation of a modification of the passenger car.

Similar characters of reference designate like parts throughout the different views of the drawings.

Figure 1:
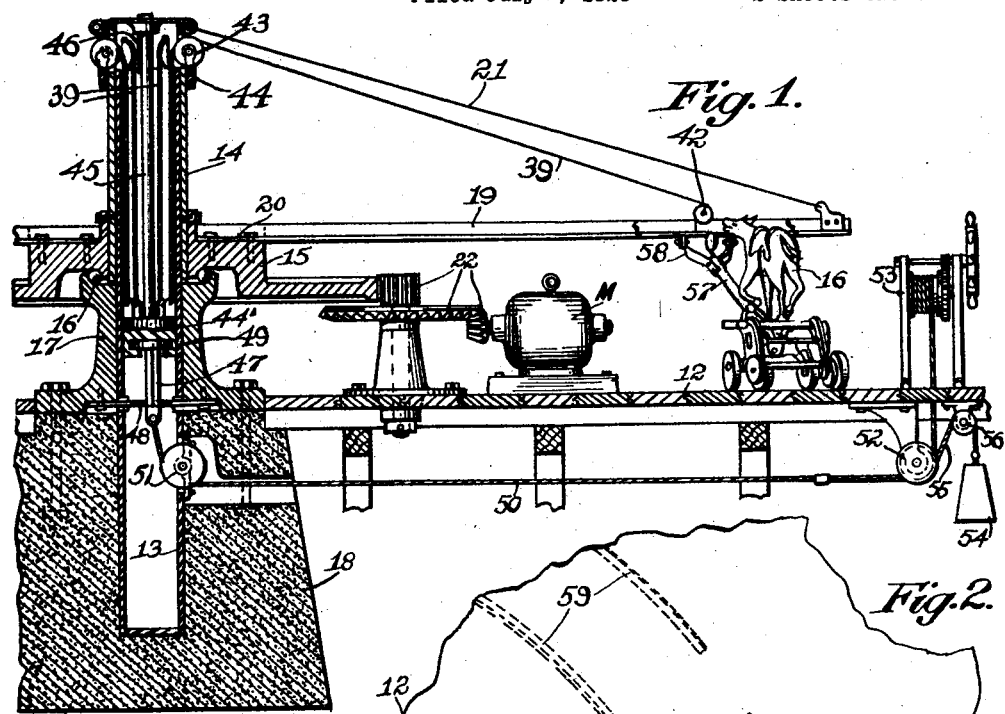

In carrying out the embodiment of the invention shown in the drawings, there is provided a stationary platform 12 with a tower 13 arranged centrally thereof. A hollow shaft 14 is rotatably engaged on the tower, said shaft 14 being carried by a head 15 rotatably supported through anti-friction bearing members shown as balls 16, upon a bearing 17 concentric of the tower mounted upon a suitable foundation 18 shown as of concrete, and in which the lower end of the tower 13 also engages. The shaft carrying head 15 also constitutes the driver for the shaft for which purpose it is arranged as a gear. Arms 19 extending radially from the shaft 14 and fixed to the head 15, as at 20, have passenger carrying cars 16 connected thereto for propelling said cars over the platform 12 the arms being further supported by truss wires 21 from the top of the tower. The shaft 14 with the arms 19 are rotated from a suitable source of power, shown as, an electric motor M operatively connected to the same by gearing as shown at 22.

Figure 2:
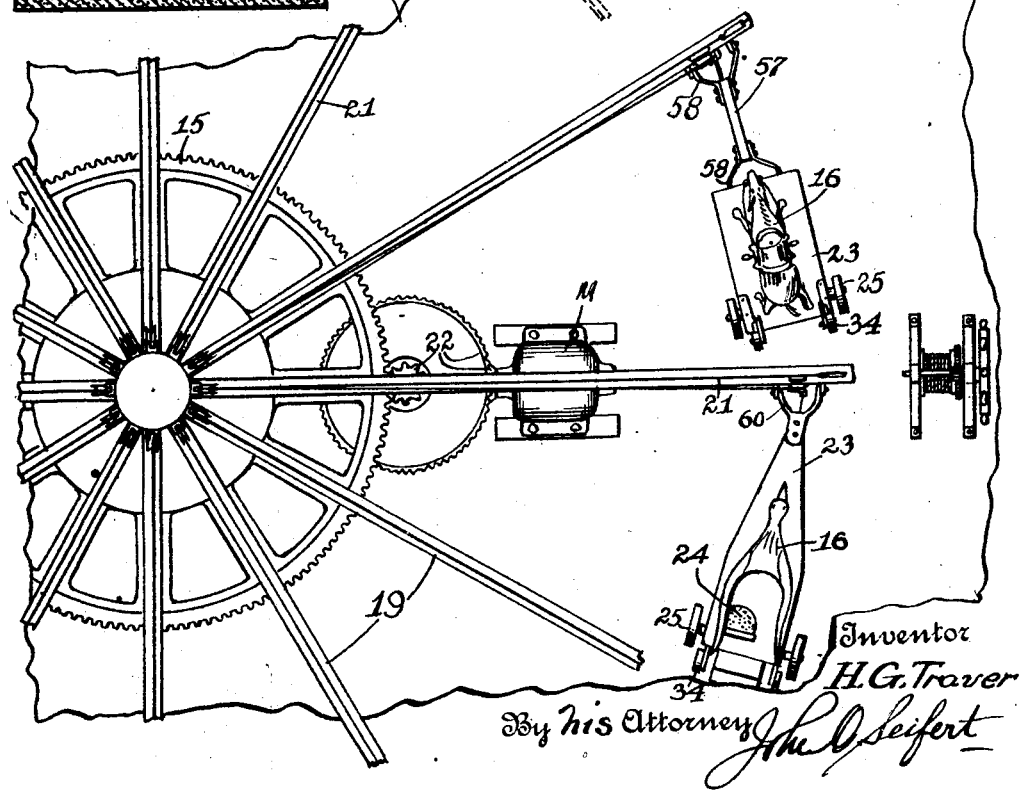
Figure 2 is a fragmental plan view of the amusement device looking at the top of Figure 1.

The passenger carrying cars comprise a body portion 23 upon which is mounted the passenger car proper, which may be of any suitable form, such as, a vehicle body or in simulation of an animal or bird, in the present instance in simulation of a horse or donkey as shown in Figures 3 and 4, or a goose, as shown in Figure 11, the latter being arranged as a chariot, as shown at 24, in plan, in Figure 2. The car body 23 is supported at the rear by eccentrically mounted traction wheels 25 carried by a mounting member 26 fixed to or forming a part of the body, to transmit a wobbly motion to the car when propelled over the platform in an upward and downward direction. The body is preferably supported at the front by concentrically mounted traction wheels 27 rotatably carried in the bifurcations of arms 28 pivotally mounted to have independent movement on a vertical axis in bifurcated ends, as at 29, of an axle 30, the latter being mounted intermediate the ends, as at 31, in a frame 32 to have movement on a horizontal axis extending transverse to the wheel carrying arms 28 and longitudinally of the car or carrier. The frame 32 is fixed to or forms an integral part of the body 23. To provide counterbalancing force against the movement of the body about the pivotal support 31 of the wheel carrying arm or axle 30, arms 33 of resilient material are fixed at one end to the bottom of the body with the free ends engaging upon the pivot supports of the wheel carrying arms 28 and tensioned to exert yieldingly downward counterbalancing force upon the wheel carrying axle 30. By the mounting of the wheels 27 as described they serve as steering or guiding wheels for the cars as they are propelled upon the platform through the revolving movement of the arms 19 about the tower. By the eccentric mounting of the wheels 25 an up and down movement is imparted to the rear portion of the car and sidewise undulating or wobbly movement is imparted to the car due to the connection of the front wheel carrying axle with the body to permit of the body to have movement on a horizontal axis extending longitudinally of the body through the movement thereof as it is propelled upon the platform thereby imparting novelty to the ride and a thrill to a passenger. The wheels 27 may also be eccentrically mounted whereby a sinuous undulating or wobbly motion will be imparted to the carrier through the movement thereof thus further enhancing the novelty of the ride.

To add further novelty to the ride a further set of auxiliary and concentrically mounted traction wheels 34 are adjustably connected to the body 23 to be substituted for the set of wheels 25 to support and transport the car in place of said wheels 25 and whereby the cars are moved in an even course upon the platform, and means are provided to adjust said wheels to transport the cars by said wheels in place of the wheels 25 while the car is in motion. These wheels are journaled on the ends of an axle 35 fixedly carried by arms 36 pivotally carried by lugs 37 on the mounting member 26. The distance between the pivotal support 37 of the arms and the axle 35 is greater than the distance between said support 37 and the eccentric support for wheels 25 and as the wheels 34 are adjusted to the dotted line position shown in Figure 3 the rear portion of the car will be raised sufficiently to move the eccentric wheels out of engagement with the traction surface of the platform and support the car by the wheels 34 to be transported thereby.

To adjust the wheels 34 to position in contact with the platform one end of a cable 39 is connected to a transverse connecting bar 40 for the wheel carrying arms 36 guided below the body to a grooved pulley 41 (Figures 9 and 10) carried by a bracket mounted on the carrier propelling arm 19 to rotate on an axis extending longitudinally of the arm and over a second grooved pulley 42 carried by a bracket mounted on the arm 19 to rotate on an axis extending transverse to said arm, and leading from the pulley 42 over one of a series of grooved pulleys 43 carried by a head 44 fixed upon and rotatable with the shaft or sleeve 14 and to which head the truss wires 21 are secured. The end of the wheels adjusting cable 39 is secured to a head 44' rotatably and slidably engaging in the tower 13, rotating movement being imparted thereto from the sleeve 14 through the head 44 by a shaft 45 to one end of which the head 44' is fixed, the shaft 45 slidably engaging in an opening centrally in the head 44. To impart the rotary movement of head 44 to the shaft 45 the latter may be square in cross section to engage a correspondingly shaped opening in head 44, but as shown the shaft and head are rotatably connected by a spline or key 46 fixed in the shaft engaging a keyway in the head.

To adjust the head 44' and thereby the wheel supporting arms 36 to position the wheels 34 in contact with the platform and support the car thereby a shaft 47 is slidably mounted and held against rotation in a plate 48 extending transversely of the tower with parts extending through openings in the tower and fixed to the bottom of the supporting bearing 17, the shaft for this purpose being square in cross section. The shaft 47 has a thrust bearing and frictional connection with the head 44'. For this purpose the shaft 47 has a disk 49 fixed thereto and connected to the head 44' by a perforated cap secured to the head 44', the shaft 47 extending through the cap, the latter engaging below the disk and forming in conjunction with the head 44' a raceway for the disk.

Suitable means are provided for imparting adjustment to the shaft 47 and to retain it in adjusted position, and is shown as comprising a cable 50 connected to the shaft 47 passing over a pulley 51 and through openings in the tower and supporting foundation 18 to a pulley 52 and guided by the latter to the drum of a winch, indicated in a general way at 53 arranged at the outer edge of the platform (Figures 1 and 2). To counterbalance the adjusting means, a counterweight 54 is suspended by a cable 55 from a pulley 56 below the platform, the weight suspending cable passing over the pulley 52 and connected to the adjusting cable 50. As the cable 50 is wound on the winch drum the pull on the cable will move the wheel supporting arms 36 to the dotted line position in Figure 3 to support the car 16 by said wheels. As the adjusting cable 39 is slackened the traction contact of the wheels 34 with the platform will move them rearward out of car supporting position so that the car will be supported by the eccentrically mounted wheels 25. Means may be provided to yieldingly urge the wheels 34 to the full line position shown in Figure 3 when the adjusting cable is slackened, but this is not essential as they may have idle contact with the platform while the car is being supported and transported by the wheels 25. The adjustment of the wheels 34 in a direction toward the wheels 25 is limited by the arm connecting bar 40 engaging laterally extending portions 56 of the members of frame 26 (Figures 3 and 6).

The cars 16 are maintained in fixed spaced relation to the propelling arms 19 and propelled by said arms in a definite course. For this rigid means are provided to connect the cars to said arms 19, and in connection with the form of car shown in Figure 3 comprise a pole 57 (Figures 1 and 2) connected to the car body and the arm 19 by brackets 58 fixed to the pole and pivotally connected to the car and arm to have movement on an axis extending transversely of the car but firmly holding the car from having lateral movement in a direction longitudinally of the arms 19 or swing outward by the revolving of said arms. This connecting means also serve to resist the force of the pull on the adjusting cable 39 when adjusting the wheels 34 to car supporting position.

The passenger carrying cars may be provided only with the fixedly supported wheels 25 and adjustably supported wheels 34 as shown in Figure 11. In this arrangement the body portion is directly connected to the arm 19 by bracket 60 fixed to the body and the guide wheel 41 for the adjusting cable is carried by a bracket 61 fixed to the body. If desired the pole 57 may be tubular as shown in Figure 10 through which the adjusting cable passes to serve as a guide therefor. By the arrangement of connecting the front wheel carrying arm 30 to have movement on the pivot support 31, which is arranged coincident with the longitudinal axis of the car, the car may have movement imparted about said pivot support 31 through the eccentric mounting of the wheels 25 and the changing position of one of said wheels on its support or axle relative to the other of said wheels.

In the use of the device without the feature of the auxiliary wheels 34 in order to propel the cars 16 in a definite course and prevent outward movement of the cars as they are propelled by the arm 19, a track may be provided, as shown in dotted lines at 59 in Figure 2. The rails of the track may have portions of lateral undulating or sinuous form to also impart sinuous movement to the car and thus adding still further novelty to the ride.

While I have shown and described one embodiment of the invention it will be obvious that various modifications may be made in construction and arrangement of parts without departing from the scope of the invention and that portions of the invention may be used without others and come within the scope of the invention.

Having thus described my invention, I claim:

1. In an amusement device, a passenger car, eccentrically mounted rear wheels therefor to transmit a wobbly motion to the car, and concentrically mounted front wheels, concentrically mounted auxiliary wheels adjustably mounted on the car and normally out of contact with the traction surface, and means for positioning said latter wheels in contact with the traction surface and position the eccentrically mounted wheels out of contact with the traction surface to introduce an even motion to the car.

2. In an amusement device a passenger car having eccentrically mounted rear wheels to transmit an up and down undulating motion to the car and front wheels mounted to rotate on a central axis, means to support the car on said wheels to have movement about its longitudinal axis, auxiliary wheels rotatable on an axis centrally thereof adjustably mounted at the rear of the car and normally out of traction position, and means for moving said wheels to traction and car supporting position and relieving the weight of the car from the eccentrically mounted wheels to impart an even motion to the car when propelled.

3. In an amusement device, a platform, a fixed supporting tower, a sleeve rotatably mounted on the tower, arms carried by the sleeve and extending laterally thereof, means for rotating said sleeve and arms, passenger cars supported by eccentrically mounted traction wheels to impart a wobbly motion to the car, centrally mounted wheels adjustably mounted on the car normally out of traction and car supporting position with the platform, means to rigidly connect the cars to the arms, and means to adjust said centrally mounted wheels into traction and car supporting position on the platform while the car is in motion on the platform by the rotating movement of the arm.

4. In an amusement device, a stationary platform having a tower arranged centrally thereof, arms radiating from and revoluble about the tower, passenger cars connected to the arms and propelled upon the platform through the revolving of the arms about the tower, said cars being arranged with a set of traction wheels adjustably fixedly connected to the car and a set of traction wheels connected to the car and normally out of car supporting position and the car supported by the fixedly connected wheels, and the adjustable wheels adapted to be positioned to support the car therefrom and position the fixed wheels out of contact with the platform.

5. An amusement device as claimed in claim 4 wherein the wheels of one set of wheels are rotatable about an axis eccentric to the center of the wheels, and the wheels of the other set of wheels are rotatable about an axis centrally of the wheels.

6. An amusement device as claimed in claim 4 wherein the wheels of the set fixedly connected to the car are rotatable about an axis eccentric to the center thereof, and the wheels of the adjustable set are rotatable about an axis centrally thereof.

7. An amusement device in accordance with claim 4 wherein the means to adjust the adjustable wheels comprise a cable connected to a support for said wheels and extended forwardly of the car to guide rollers at the end of the arms to top of the tower and then to the base of the tower and connected to means to take up and let out the cable.

8. An amusement device in accordance with claim 4 wherein the means to adjust the adjustable wheels comprise a cable connected to a support for said wheels and extended forwardly of the car to guide rollers at the end of the arms and over a roller carried by a head at the top of the tower and rotatable with the arms to a head slidable and rotatable within the tower, and means to adjust said latter head to take up and let out the cable.

9. In a passenger car for amusement rides, a body portion, a pair of traction wheels to rotate about axes centrally of the wheels, a second pair of traction wheels to rotate about axes eccentric to center thereof, means to connect one pair of said wheels in fixed position to the body portion, means to adjustably connect the other pair of wheels to the body portion, said body portion being normally supported by the fixed wheels in traction position, and the adjustably connected traction wheels adapted to be moved to traction position and thereby moving the fixedly connected wheels out of traction position.

10. In a passenger car for amusement rides, a body portion, eccentrically mounted traction wheels for normally supporting the car, a bracket carrying traction wheels to rotate on an axis concentrally thereof pivotally supported by the body, means to normally urge the bracket to position with the wheels out of traction position, and means for adjusting the bracket to move the concentrically mounted wheels into traction and car supporting position and thereby lift the eccentrically mounted wheels out of contact with the traction surface.

11. In a passenger car for amusement rides, a body portion, concentrically mounted wheels at the forward end of the body, eccentrically mounted traction and supporting wheels at the rear of the body, a bracket pivotally supported at the rear of the car body, wheels concentrically mounted on said bracket and the bracket normally in position with said wheels out of engagement with the traction surface, and means for moving the bracket to position the wheels carried thereby into contact with the traction surface and car supporting position to impart an even motion to the car.

12. In a passenger carrier for amusement rides, a body portion, two pairs of traction wheels, an axle at one end of the body upon which one pair of wheels are rotatably mounted eccentric to the axis of the wheels, a second axle, an arm mounted on each end of said latter axle to have movement on a vertical axis by which arms the other pair of wheels is mounted to rotate on an axis concentric of the wheels, and means to mount the body upon the end opposite to the eccentrically mounted wheels upon said second axle to have movement about a horizontal axis extending longitudinally of the body.

13. In a passenger carrier for amusement rides, a body portion, two pairs of traction wheels, an axle at one end of the body by which one pair of wheels is rotatably carried eccentric to the axis of the wheels, a second axle by which the other wheels are carried to rotate on an axis concentrically thereof and upon which the body is mounted to have undulating movement about the longitudinal axis thereof imparted thereto by the rotation of the eccentrically mounted wheels as the carrier is propelled, and resilient means interposed between the second axle and body to urge the body to position of equilibrium.

Signed at Beaver Falls in the county of Beaver and State of Pennsylvania, this 17th day of June, 1925.

HARRY G. TRAVER.